United States Patent
Bruno

(10) Patent No.: US 9,264,133 B2
(45) Date of Patent: Feb. 16, 2016

(54) NETWORK TRAFFIC MONITORING APPARATUS FOR MONITORING NETWORK TRAFFIC ON A NETWORK PATH AND A METHOD OF MONITORING NETWORK TRAFFIC ON A NETWORK PATH

(75) Inventor: Gianmarco Bruno, Genoa (IT)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 112 days.

(21) Appl. No.: 14/131,492

(22) PCT Filed: Jul. 8, 2011

(86) PCT No.: PCT/EP2011/061666
§ 371 (c)(1),
(2), (4) Date: Mar. 13, 2014

(87) PCT Pub. No.: WO2013/007283
PCT Pub. Date: Jan. 17, 2013

(65) Prior Publication Data
US 2014/0219650 A1 Aug. 7, 2014

(51) Int. Cl.
*H04B 10/00* (2013.01)
*H04B 10/07* (2013.01)
(Continued)

(52) U.S. Cl.
CPC ........ *H04B 10/0705* (2013.01); *H04B 10/0795* (2013.01); *H04L 43/12* (2013.01); *H04L 49/208* (2013.01); *H04L 49/555* (2013.01); *H04L 63/30* (2013.01); *H04Q 3/0087* (2013.01)

(58) Field of Classification Search
CPC ........... H04B 10/0795; H04B 10/0705; H04Q 3/0087; H04L 49/208; H04L 49/555; H04L 43/12; H04L 63/30
See application file for complete search history.

(56) References Cited

U.S. PATENT DOCUMENTS 5,712,716 A * 1/1998 Vanoli ................... H04B 10/077
                                                        398/26
5,793,122 A * 8/1998 Dingwall ................ B60R 25/04
                                                        200/61.08
(Continued)

FOREIGN PATENT DOCUMENTS

| GB | 2448354 | 10/2008 |
| WO | WO-99/63726 | 12/1999 |
| WO | WO-2011/103930 | 9/2011 |

OTHER PUBLICATIONS

"Optical monitoring for DWDM systems", *ITU-T Recommendation G.697*, (Jun. 2004), 24 pages.
(Continued)

*Primary Examiner* — Danny Leung
(74) *Attorney, Agent, or Firm* — Nicholson De Vos Webster & Elliott, LLP

(57) ABSTRACT

A network traffic monitoring apparatus and method of monitoring network traffic on a network path is disclosed. The apparatus comprises a first path arranged to receive a portion of the network traffic from the network path and a monitoring port arranged to monitor the portion of network traffic. The apparatus further comprises a switch having an input port communicatively coupled to the first path, and an output port communicatively coupled to the monitoring port. The switch is arranged to selectively toggle between the first state in which the portion of network traffic can pass from the input port to the output port and a second state, in which the portion of network traffic is prevented from passing from the input port to the output port, in dependence of a switching signal. The apparatus further comprises a second path for communicating a monitoring status signal to a network device.

16 Claims, 5 Drawing Sheets

(51) Int. Cl.
*H04L 12/26* (2006.01)
*H04L 29/06* (2006.01)
*H04L 12/931* (2013.01)
*H04L 12/939* (2013.01)
*H04Q 3/00* (2006.01)
*H04B 10/079* (2013.01)

(56) References Cited

U.S. PATENT DOCUMENTS

| | | | | |
|---|---|---|---|---|
| 6,134,004 A * | 10/2000 | Reagen | ............... | G01N 21/03 356/450 |
| 6,549,572 B1 * | 4/2003 | Anderson | ............ | H04B 10/079 375/225 |
| 6,681,079 B1 * | 1/2004 | Maroney | ............ | H04B 10/038 398/13 |
| 6,751,371 B1 * | 6/2004 | Fevrier | ............... | H04B 10/0793 385/15 |
| 6,950,215 B2 * | 9/2005 | Fant | ............... | G02B 6/3562 359/16 |
| 7,257,325 B1 * | 8/2007 | Barbarossa | ........ | H04B 10/0795 398/12 |
| 2002/0083246 A1 * | 6/2002 | Rupp et al. | ............... | 710/107 |
| 2002/0196430 A1 * | 12/2002 | May | ............... | G01J 1/42 356/213 |
| 2003/0123782 A1 * | 7/2003 | Miyata | ............... | G02F 1/0121 385/15 |
| 2004/0037556 A1 * | 2/2004 | Matz | ............... | H04B 10/032 398/40 |
| 2008/0298804 A1 * | 12/2008 | Noble | ............... | A61B 5/06 398/45 |
| 2010/0027993 A1 * | 2/2010 | Yamaguchi | ........ | H04B 10/0795 398/25 |
| 2011/0116789 A1 * | 5/2011 | Wellbrock | .......... | H04J 14/0279 398/5 |
| 2014/0219650 A1 * | 8/2014 | Bruno | ............... | H04L 43/12 398/25 |

OTHER PUBLICATIONS

"Security architecture for systems providing end-to-end communications", *ITU-T Recommendation X.805*, (Oct. 2003), 28 pages.

PCT International Search Report for PCT Counterpart Application No. PCT/EP2011/061666, (Jul. 10, 2012), 4 pages.

PCT Written Opinion of the International Searching Authority, PCT Counterpart Application No. PCT/EP2011/061666, (Jan. 8, 2014), 5 pages.

PCT International Preliminary Report on Patentability (Chapter I), PCT Counterpart Application No. PCT/EP2011/061666, (Jan. 14, 2014), 6 pages.

* cited by examiner

NETWORK TRAFFIC MONITORING APPARATUS FOR MONITORING NETWORK TRAFFIC ON A NETWORK PATH AND A METHOD OF MONITORING NETWORK TRAFFIC ON A NETWORK PATH

CROSS-REFERENCE TO RELATED APPLICATIONS

This application is a National stage of International Application No. PCT/EP2011/061666, filed Jul. 8, 2011, which is hereby incorporated by reference.

TECHNICAL FIELD

The present invention relates to network traffic monitoring apparatus for monitoring network traffic on a network path and a method of monitoring network traffic on a network path.

BACKGROUND

Modern optical communication systems comprising optical communication paths are capable of transmitting optical traffic signals several thousands of kilometers between network elements, without any requirement to regenerate the signals. As a result, any monitoring of the traffic on the communication paths is typically performed at the input and output ports of the network elements.

The monitoring of the traffic on the communication paths is necessary in order to determine the optical signal-to-noise ratio, the power of the traffic and to generate transmission reports, for example. The monitoring points typically comprise optical splitters which are arranged to extract a portion, typically 1-10% of the optical signal from the communication path, so that the portion of traffic can be subsequently analysed. The analysis may comprise passing the traffic to a photodiode for measuring the optical power on the path to control the power on the path for example, or to an optical spectrum analyzer for a subsequent analysis of the frequency components of the traffic.

When monitoring the optical power of the traffic on the path, since only a total power is presented to an operator for example, then no useful traffic information can be deduced. However, since the individual traffic components are exposed with a spectrum analyzer, then this presents a security issue, since the traffic content on the path can be monitored. Any network element having a monitoring port through which the network traffic can be accessed is thus vulnerable to eavesdropping. This is particularly true for unattended network elements such as optical amplification sites, deployed at remote locations.

SUMMARY

In accordance with the present invention as seen from a first aspect, there is provided network traffic monitoring apparatus for monitoring network traffic on a network path. The apparatus comprises a first path for receiving a portion of the network traffic from the network path and a monitoring port for monitoring the portion of network traffic. The apparatus further comprises a switch which is connected between the first path and the monitoring port, which is switchable between a first state in which the first path is not communicatively coupled with the monitoring port, and a second state in which the first path is communicatively coupled with the monitoring port for monitoring the portion of network traffic. The apparatus further comprises an actuator which is arranged to switch the switch from the first state to the second state in response to a user operation, and a switch state indicator for outputting a signal to a monitoring device indicative of at least one state of the switch.

Advantageously, the apparatus is arranged to provide a notification to the monitoring device that a monitoring event is taking place, and thus facilitates a recording of the event as evidence of the monitoring of the traffic. In addition, the apparatus can be applied to communication systems irrespective of any modulation or transfer rates of the communicated traffic.

The apparatus further comprises a cover, such as a dust cap, which may be selectively removed and replaced upon the monitoring port in order to provide access to the port, for example. In this case, the user operation may comprise removing the cover, such that upon removing the cover, the actuator causes the switch to change from the first state to the second state. Similarly, upon replacing the cover, the actuator may be arranged to cause the switch to change from the second state to the first state. Alternatively, or in addition thereto, the actuator may be arranged to change the state of the switch between the first and second state, upon pressing a button or similar.

The apparatus may further comprise a lock and the user operation may comprise or further comprise unlocking the lock via a user access key. For example, the lock may comprise a code entry device and the user access key may comprise a code which is entered into the code entry device. Upon locking the lock, the actuator may be further arranged to change the state of the switch from the second state back to the first state. The signal to a monitoring device is indicative of a user identity associated with the user access key and it is envisaged that the user access key may be used to gain access into a housing of the apparatus. The user access key thus provides for an improved security at the infrastructure level by only allowing authorised users to access the monitoring port.

In accordance with an embodiment of the present invention, the network monitoring apparatus comprises the monitoring device and the monitoring device is arranged to record when the switch is in the second state. It is envisaged that the monitoring device may be arranged to record the identity of the user. In accordance with a further embodiment of the present invention, the apparatus further comprises an access command input for receiving an access command instruction from a network management or controller device, for example. The access command instruction is arranged to enable the switch to change state, and the actuator is arranged to only switch the switch from the first state to the second state in response to the user operation if an appropriate access command instruction has been received at the access command input.

In each of the described embodiments, the signal from the switch state indicator to a monitoring device empowers the apparatus to record a monitoring event so that the recording can be used to refute any denial that the monitoring event took place or any unscrupulous monitoring activity. To further improve the security of the traffic on the network path, the apparatus may further comprise a signal transformation or encryption apparatus connected in series with the switch between the first path and the monitoring port. The signal transformation apparatus is arranged to receive the portion of the network traffic and to transform or otherwise apply a transfer or encryption function to the portion to form a monitoring signal which is output to the monitoring port. The transformation apparatus and in particular the transfer or encryption function is arranged to preserve a spectral property of the portion of network traffic and to apply a time-domain obfuscation to the portion of traffic so that the monitored traffic is not directly discernible to the user without the knowledge of the transfer function.

The switch state indicator is arranged to output the signal to a monitoring device in response to a change in state of the switch and in accordance with a further embodiment of the present invention, the first path is communicatively coupled to monitoring device for transmitting the portion of network traffic to the monitoring device.

In accordance with the present invention as seen from a second aspect, there is provided a node for a communications network comprising: a network path for the transmission of network traffic, a node device for processing of the network traffic and a network traffic monitoring apparatus according to the first aspect.

In accordance with the present invention as seen from a third aspect, there is provided a method of monitoring network traffic on a network path. The method comprises receiving a portion of the network traffic from the network path and monitoring the portion of network traffic via a monitoring port. The method further comprises switching a switch connected between the network path and the monitoring port, from a first state in which the network path is not communicatively coupled with the monitoring port, to a second state in which the network path is communicatively coupled with the monitoring port for monitoring of the portion of network traffic, in response to an operation by a user. The method further comprises outputting a signal to a monitoring device indicative of at least one state of the switch.

The method of monitoring network traffic may further comprise recording at the monitoring device when the switch is in the second state. The signal to the monitoring device may be indicative of the identity of the user and the recording at the monitoring device may comprise or further comprise the recording of the identity of the user.

BRIEF DESCRIPTION OF THE DRAWINGS

Embodiments of the present invention will now be described by way of example only and with reference to the accompanying drawings in which.

DETAILED DESCRIPTION

Figure 1:
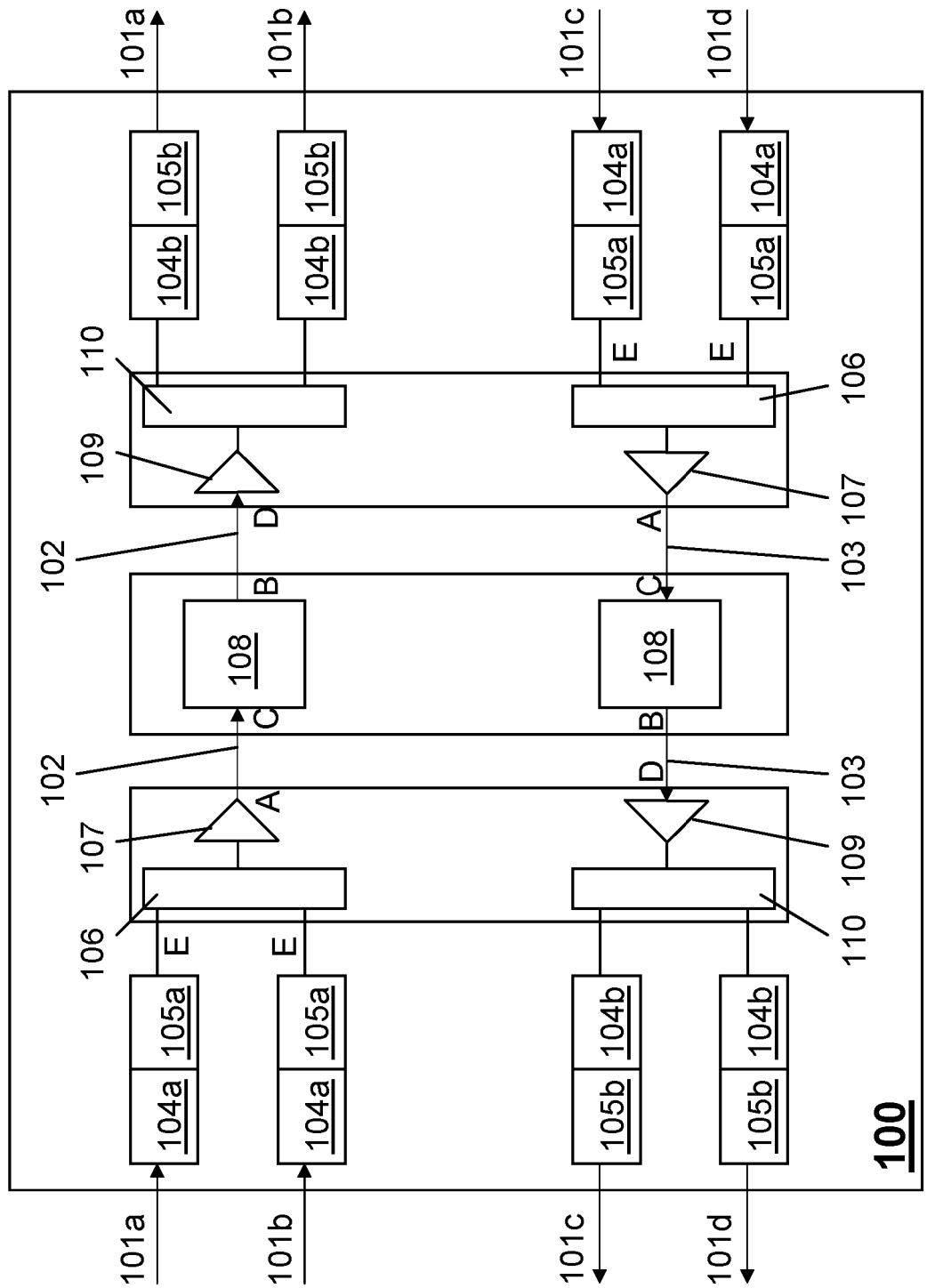
FIG. 1 is a schematic illustration of a known two stage optical communication amplifier, illustrating the typical positions for monitoring network traffic.

Referring to FIG. 1 of the drawings, there is illustrated a typical two stage optical amplifier 100 network element, for amplifying optical network traffic on optical communication paths 101a-d. The illustrated amplifier 100 comprises a first transit path 102 for communicating network traffic in a first direction through the amplifier and a second transit path 103 for communicating network traffic in a second direction through the amplifier 100. The incoming traffic associated with each communication path 101a-d is separately received at an input receiver 104a and then transmitted via an input transmitter 105a to a respective modulation unit 106, which is arranged to combine traffic on several paths. For example, the traffic on path 101a may be combined with the traffic on path 101b for subsequent propagation along the first transit path 102. The combined traffic is subsequently passed to a booster amplifier 107 and is output from the booster amplifier 107 to a dispersion compensation module 108, which is arranged to reduce any dispersion associated with the traffic in propagating along the communication paths 101a-d toward the amplifier 100. The traffic is subsequently output from the dispersion compensation module 108 to a pre-amplifier 109, which is arranged to further amplifier the traffic. The traffic is then demodulated using a demodulation unit 110 to separate the traffic to an output receiver unit 104b associated with the respective communication paths 101a-d. Finally, the traffic is re-transmitted along the respective communication paths 101a-d via an output transmitter 105b.

In monitoring the traffic passing through the amplifier 100 along the transit paths 102, 103, a portion of the traffic may be extracted at the output A of the booster amplifier 107 or the output B of dispersion compensation module 108, or at the input C to the dispersion compensation module or the input D to the pre-amplifier 109, and passed to an optical spectrum analyser (not shown) to analyse the frequency content of the traffic. Alternatively, a portion of the traffic may be extracted at the output E of the input transmitters 105a or at the input C to the dispersion compensation module 108 to monitor, and possibly regulate and control the power of the traffic passing through the amplifier 100.

Referring to FIGS. 2a, 2b, 2c, and 3 of the drawings, there are illustrated network traffic monitoring apparatus 10 according to several embodiments of the present invention for monitoring network traffic, for example the traffic passing along the transit paths 102, 103 of the above described amplifier 100. It is to be appreciated, however, that the network traffic monitoring apparatus 10 may be used to directly monitor the traffic on the communication paths 101a-d, or traffic which is arranged to pass through alternative network elements. The embodiments separately comprise a path splitter 11 which is arranged to extract a portion of the traffic on the path 102, 103, namely a reduced power representation of the network traffic, and re-direct the portion of traffic to a first path 12 such as an optical fibre, of the apparatus 10. The first path 12 is arranged to communicate the portion of traffic to an optical switch 13, which is arranged to selectively communicate the traffic to a monitoring path 14, which may similarly comprise an optical fibre. The monitoring path 14 comprises a monitoring port 15 so that a network operator (not shown) for example, can monitor the traffic on the monitoring path 14 to ascertain various propagation characteristics of the traffic such as optical signal-to-noise ratio and optical power in the transit path 102, 103. The apparatus 10 further comprises a monitoring device 16 such as a management device, which is arranged to receive a monitoring signal 17 from a switch state indicator along a second path 18 (which may comprise an optical fibre) of the respective apparatus 10. The monitoring signal 17 is arranged to notify the device 16 of a monitoring event, so that the device 16 can record or arrange for the recording of the monitoring event.

The switch 13 comprises an input port 13a and a first and second output port 13b, 13c. The input port 13a is communicatively coupled with the first path 12 and the first output port 13b is communicatively coupled with the monitoring path 14. The switch 13 is arranged to toggle between a first state, in which traffic is prevented from passing from the first path 12 to the monitoring path 14 and a second state, in which traffic is permitted to pass from the first path 12 to the monitoring path 14.

The apparatus 10 further comprises an actuator 19 which is arranged to change the state of the switch 13 between the first and second state in response to a user operation, such as the removal of a cover 20 or cap, such as a dust cap, from the monitoring port 15 on the monitoring path 14 and/or by pushing a button 21. In this respect, upon removing a dust cover 20, the actuator 19 may be arranged to change the state of the switch 13 from the first state to the second state. Conversely, upon replacing the dust cover 20, the actuator 19 may be arranged to cause the switch 13 to change from the second state to the first state.

Alternatively, or in addition thereto, the apparatus may comprise a lock 22 which may be arranged to control a physical access to the monitoring port 15. For example, the lock may be used to control access through a door (not shown) of a housing (not shown) of the apparatus 10. The lock 22 is locked and unlocked using a user access key which may comprise a physical key 23 or a code which may be entered on a code entry device, such as a keypad 24. In both cases, upon unlocking the lock 22, the actuator 19 is arranged to cause the switch 13 to change from the first state to the second state and upon locking the lock 22, the actuator 19 may cause the switch 13 to change from the second state back to the first state. In this respect, the user access key may be used to authenticate the network operator (not shown) to ensure that the monitoring event is performed by an authorised person.

It is envisaged that the user operation may cause the actuator 19 to change the state of the switch via a mechanical link (not shown). However, it is to be appreciated that the user operation may alternatively be arranged to generate a switching signal 25 to control the actuator 19 and thus the state of the switch 13. In this respect, upon removing the dust cover 20 or pressing a button 21 for example, or unlocking the lock 22, a switching signal 25a, 25b respectively, may be generated to cause the actuator 19 to change the state of the switch 13 from the first state to the second state. Upon further pressing the button 21, or replacing the dust cover 20 or locking the lock 22, a further switching signal 25 may be generated to cause the actuator 19 to change the state of the switch 13 back to the first state.

Figure 2A:
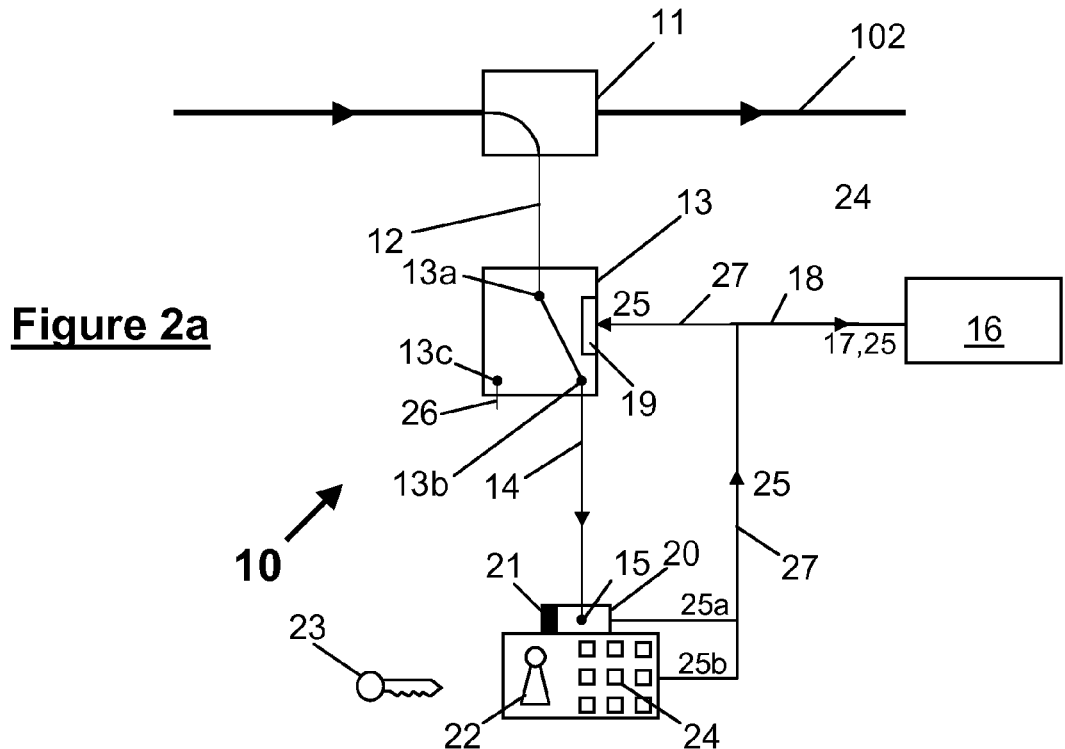
FIG. 2a is a schematic illustration of a network traffic monitoring apparatus according to a first embodiment of the present invention.

According to a first embodiment of the present invention as illustrated in FIG. 2a of the drawings, the second output port 13c of the switch 13 is communicatively coupled with a traffic sink, such as an optical stop 26, such that when the switch 13 is arranged in the first state, the portion of traffic on the first path 12 is communicated from the switch input 13a to the second switch output 13c and thus to the stop 26.

In this embodiment, the switch state indicator comprises the dust cover 20 and/or lock 22, such that the monitoring signal 17 which is used to notify the monitoring device 16 of the monitoring event, comprises the switching signal 25 itself, for example. Accordingly, once the door (not shown) of the apparatus 10 has been opened and the cover 20 on the monitoring port 15 has been removed for example, the resulting switching signal 25 is communicated along a transfer path 27 to the actuator 19, and along the second path 18 as a monitoring signal 17 to the device 16, so that the device 16 can monitor and if necessary record the monitoring event. For example, the device 16 may be arranged to record the event date, the monitoring time and the traffic monitored, in addition to the identity of the operator based on the user access key, so that the recording can be presented as evidence in the event that the monitoring event is repudiated.

Figure 2B:
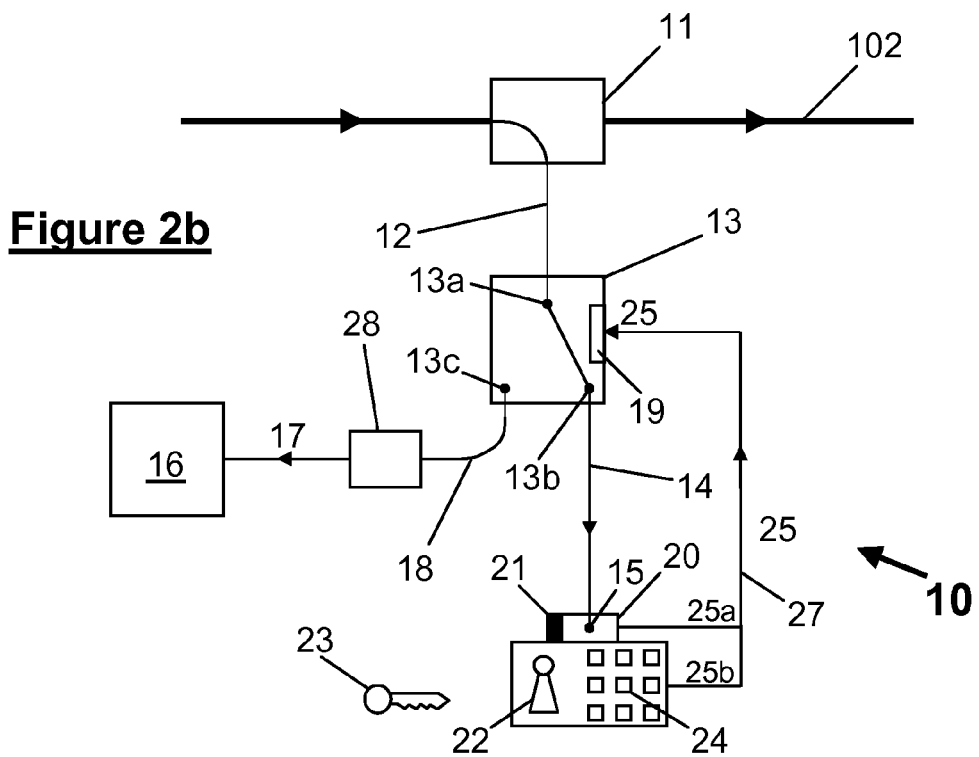
FIG. 2b is a schematic illustration of a network traffic monitoring apparatus according to a second embodiment of the present invention.

According to a second embodiment of the present invention, as illustrated in FIG. 2b of the drawings, the second output port 13c of the switch 13 is communicatively coupled to the second path 18, such that when the switch 13 is arranged in the first state, the portion of traffic on the first path 12 is communicated from the switch input 13a to the second switch output 13c and thus along the second path 18.

In this embodiment, the switch state indicator is disposed within the second path 18 and comprises a power monitoring device, such as a photodiode 28, which is arranged to monitor the optical power level of the traffic on the second path 18 to determine whether there is a flow of traffic on the second path 18, and thus the state of the switch 13. Accordingly, with the switch 13 arranged in a first state, which enables traffic to flow from the first path 12 along the second path 18 to the photodiode 28, then the photodiode 28 will generate a signal 17 representative of a relatively high power level and thus the presence of traffic on the second path 18. This monitoring signal 17 is subsequently communicated along the second path 18 to the monitoring device 16 to indicate the state of the switch 13.

As the switch 13 changes state from the first state to the second state in accordance with the switching signal 25 for example, then the flow of traffic to the second path 18 will be interrupted. The traffic will subsequently pass from the first path 12 to the monitoring path 14 thereby enabling an operator to monitor the traffic. The power level indicated by the photodiode 28 will subsequently fall and this reduction will be communicated to the monitoring device 16 as a monitoring signal 17, to indicate that a monitoring event is taking place.

Figure 2C:
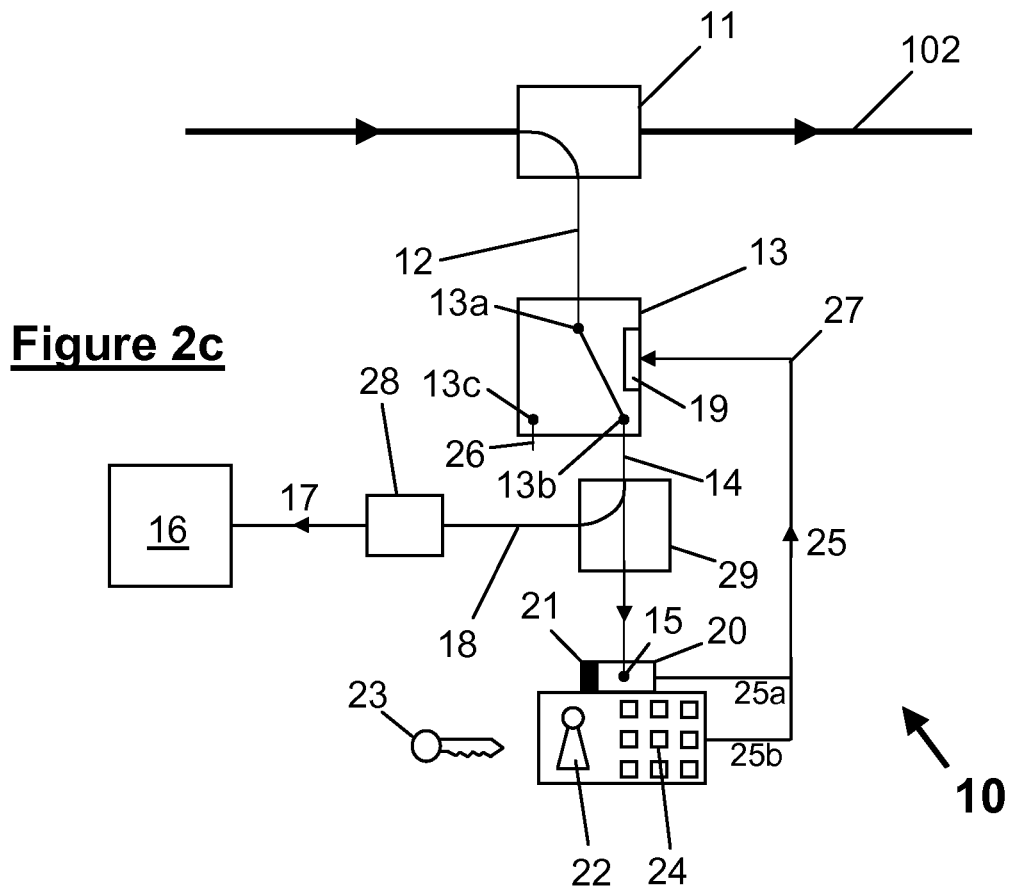
FIG. 2c is a schematic illustration of a network traffic monitoring apparatus according to a third embodiment of the present invention.

In accordance with a third embodiment of the present invention as illustrated in FIG. 2c of the drawings, the second output port 13c of the switch 13 is communicatively coupled with a traffic sink, such as the optical stop 26 described in the first embodiment, such that when the switch 13 is arranged in the first state, the portion of traffic on the first path 12 is communicated from the switch input 13a to the second switch output 13c and thus to the stop 26. The monitoring path 14 comprises a path splitter 29 disposed therein, which is arranged to extract a portion of the traffic passing along the monitoring path 14 and redirect the extracted portion to the second path 18. The switch state indicator is disposed within the second path 18 and comprises a power monitoring device, such as a photodiode 28 similar to the second embodiment, which is arranged to monitor the optical power level of the traffic on the second path 18 to determine whether there is a flow of traffic on the second path 18, and thus the switched state of the switch 13.

Accordingly, with the switch 13 arranged in a first switched state in which traffic is passed to the optical stop 26, the traffic will be prevented from passing onto the monitoring path 14 and so the photodiode 28 will generate a signal representative of a relatively low power level. In this case, the signal 17 from the photodiode 28, namely the monitoring signal 17, which is transmitted along the second path 18 to the monitoring device 16, is arranged to indicate that no monitoring is taking place. However, as the switch 13 changes state from the first state to the second state in accordance with the switching signal 25 for example, the traffic will be permitted to pass from the first path 12 to the second path 14. The subsequent communication of traffic along the monitoring path 14 and thus the second path 18 via the path splitter 29, will cause the photodiode 28 to generate a signal representative of a relatively high power level which is subsequently communicated along the second path 18 to the network device 16 to indicate that a monitoring event is taking place.

Figure 3:
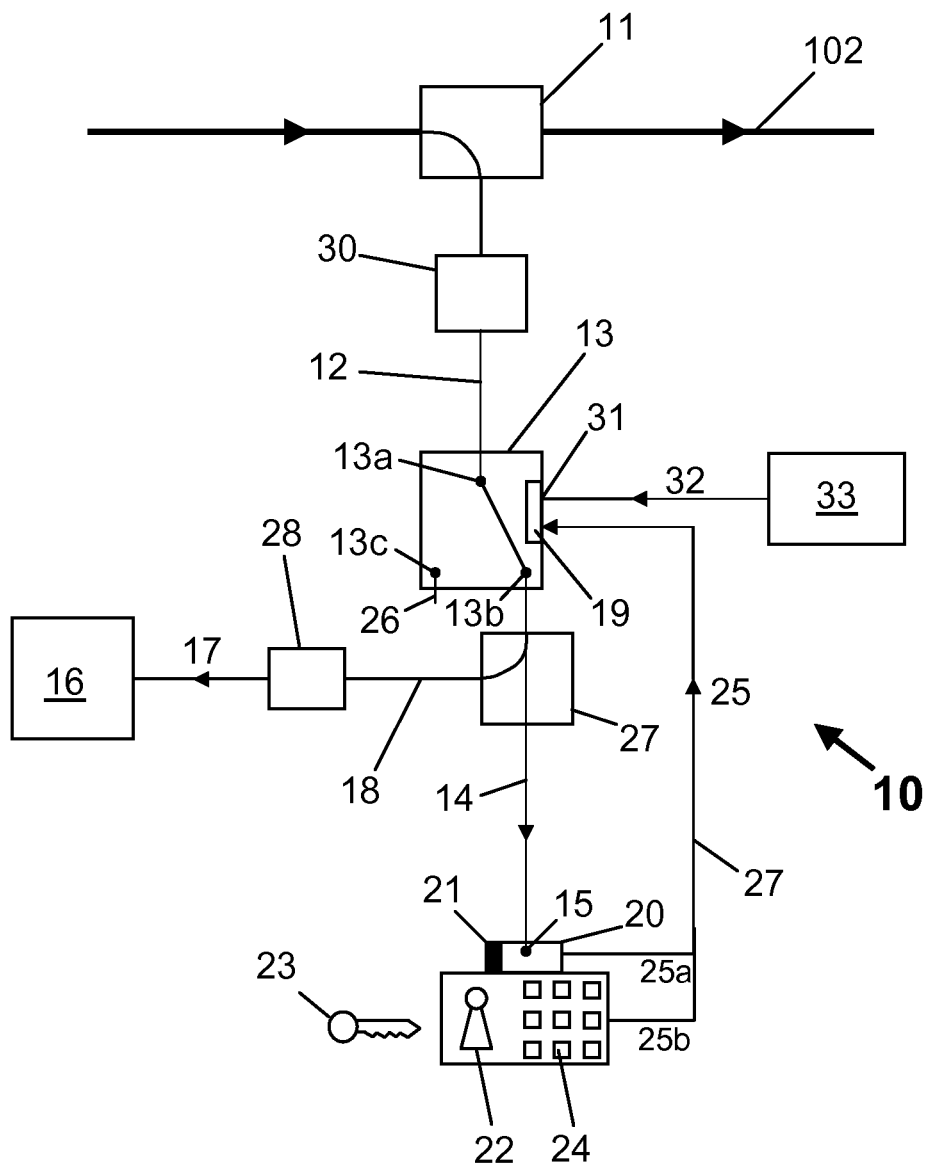
FIG. 3 is a schematic illustration of a network traffic monitoring apparatus according to a fourth embodiment of the present invention; and, FIG. 4 is a flow diagram of a method of monitoring network traffic on a network path according to an embodiment of the present invention.

Referring to FIG. 3 of the drawings, there is illustrated a network traffic monitoring device 10 according to a fourth embodiment of the present invention. The apparatus 10 of the fourth embodiment comprises the apparatus 10 of the third embodiment with the addition of a signal transforming apparatus connected in series with the switch 13 between the first path 12 and the monitoring port 15. The signal transformation apparatus comprises a transformation or encryption module 30 and is arranged to receive the portion of the network traffic and to apply a transfer function to the portion to form a signal for output from the monitoring port 15. The module 30 is arranged to preserve a spectral property of the portion and to apply a time-domain obfuscation to the portion of traffic to transform or otherwise encrypt the traffic flowing on the monitoring path 14 to render the content of the monitored traffic indiscernible to unauthorised persons. The module 30 is arranged to provide an additional security measure so that network operators (not shown) can monitor properties of the traffic, such as the power and the associated spectral content, but are unable to deduce any knowledge of the communicated traffic. Only authorised network operators (not shown) who have prior knowledge of the transformation function or encryption algorithm, can suitably deduce the communicated traffic content by applying a corrective function to the monitored traffic.

The apparatus 10 of the fourth embodiment further comprises an access command input 31 for receiving an access command instruction 32 from a network management or controller device 33, for example, which may be located remote to the network monitoring apparatus 10. The access command input 31 is arranged to enable the actuator 19 to only switch the switch 13 from the first state to the second state in response to a user operation, such as the removal of a dust cover 20 or unlocking of the lock 22, in the event that an appropriate access command instruction has been received at the access command input 31 from the network controller 33. In this respect, the network controller 33 provides an overriding control to the monitoring of traffic on the path 102.

Figure 4:
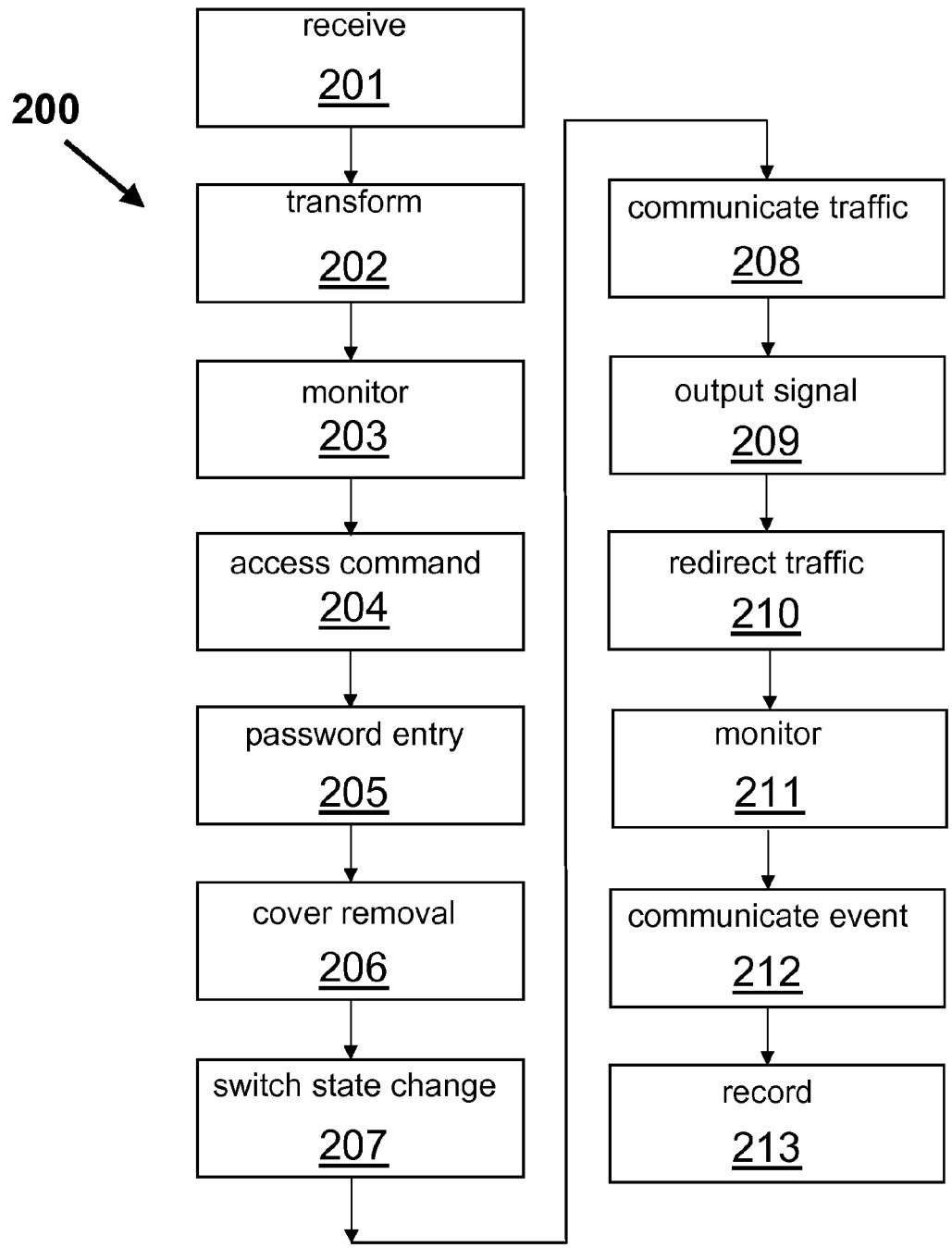

Referring to FIG. 4 of the drawings, there is illustrated a method 200 of monitoring network traffic on a network path. The method 200 provides for an improved secure monitoring of the traffic to minimize any potential eavesdropping of the communicated traffic. In monitoring traffic on a network path 101*a-d* or the transit paths 102, 103, using the apparatus 10 of the fourth embodiment, a portion of the traffic on the transit path 102 for example, is first received upon the first path 12 of the apparatus 10 at block 201, via the path splitter 11. The portion of network traffic is subsequently communicated to the transformation module 30, whereby a transfer function is applied to the portion of traffic at block 202. The transfer function is arranged to preserve the spectral property of the portion and to apply a time-domain obfuscation to obscure or otherwise encrypt the traffic content. In the absence of any requirement to monitor the traffic on the transit path 102, for example, the switching signal 25 is arranged to default to a value which causes the switch 13 of the apparatus 10 to adopt the first state and thus pass the encrypted traffic to an optical stop 26. The photodiode 28 in the second path 18 accordingly monitors a low optical power level, which is communicated as a negative monitoring signal 17 to the monitoring device 16 at block 203, to inform the device 16 of the state of the switch 13 and thus that no monitoring event is taking place.

In order to enable the switch to change state, the network controller is required to first authorize the monitoring of traffic by providing a suitable access command instruction to the access command input at block 204. Upon subsequently entering the required user access key such as a password on the keypad 24 to unlock the lock 22 and thus open a door (not shown) of the apparatus 10 for example at block 205 and/or removing a dust cover 20 from the monitoring port 15 at block 206, the switching signal 25 is arranged to change value to cause actuator 19 to change the state of switch 13 to the second state, at block 207. The traffic on the first path 12 is subsequently communicated to the monitoring path 14 at block 208 and a portion of the traffic on the monitoring path 14 is extracted using a further path splitter 29. The remaining portion of traffic on the monitoring path 14 is output at block 209 from the monitoring port 15 for analysis by the network operator (not shown). The portion of traffic extracted using the further path splitter 29 is redirected to the photodiode 28 disposed within the second path 18 at block 210. The monitored increase in optical power at block 211 is communicated as a positive monitoring signal 17 to the device 16 at block 212 which subsequently recognizes that a monitoring event is taking place and records the event at block 213.

Once the network operator (not shown) completes the required monitoring, then upon repositioning the cover 20 and closing the door (not shown) on the apparatus 10, the generated switching signal 25 is arranged to default back to its original value to cause the switch 13 to change to the second state to prevent the traffic from passing along the monitoring path 14. The monitoring apparatus 10 and method 200 according to the above described embodiments thus provide for an improved security of the communicated traffic on a network path 101*a-d*, 102, 103 during a monitoring event while also facilitating a recording of the event.

The invention claimed is:

1. A network traffic monitoring apparatus for monitoring network traffic on a network path, the apparatus comprising:
   a first path, arranged to receive a portion of the network traffic from the network path;
   a monitoring port, arranged to monitor the portion of network traffic;
   a switch coupled between the first path and the monitoring port, the switch being switchable between a first state in which the first path is not communicatively coupled with the monitoring port, and a second state in which the first path is communicatively coupled with the monitoring port for monitoring of the portion of network traffic;
   an actuator, arranged to switch the switch from the first state to the second state in response to a user operation; and
   a switch state indicator, arranged to output a signal to a monitoring device indicative of at least one state of the switch, wherein the at least one state of the switch is indicative of whether a monitoring event is taking place.

2. The network traffic monitoring apparatus according to claim 1, further comprising a cover which is detachably coupled to the monitoring port, wherein the user operation comprises removal of the cover.

3. The network traffic monitoring apparatus according to claim 1, further comprising a lock, and wherein the user operation comprises unlocking the lock via a user access key.

4. The network traffic monitoring apparatus according to claim 3, wherein the lock comprises a code entry device, and the user access key comprises a code which is entered into the code entry device.

5. The network traffic monitoring apparatus according to claim 3, wherein the signal to the monitoring device is indicative of a user identity associated with the user access key.

6. The network traffic monitoring apparatus according to claim 1, wherein the monitoring device is arranged to record when the switch is in the second state.

7. The network traffic monitoring apparatus according to claim 5, wherein the monitoring device is arranged to record when the switch is in the second state, and wherein the monitoring device is further arranged to record the user identity.

8. The network traffic monitoring apparatus according to claim 1, further comprising an access command input, arranged to receive an access command instruction, and wherein the actuator is arranged to only switch the switch from the first state to the second state in response to the user operation in response to determining an appropriate access command instruction has been received at the access command input.

9. The network traffic monitoring apparatus according to claim 1, further comprising a signal transforming apparatus coupled in series with the switch between the first path and the monitoring port, wherein the signal transforming apparatus is arranged to receive the portion of the network traffic and to apply a transfer function to said portion to form a monitoring signal for output from the monitoring port, wherein the transfer function is arranged to preserve a spectral property of said portion and to apply a time-domain obfuscation to said portion.

10. The network traffic monitoring apparatus according to claim 1, wherein the switch state indicator is arranged to output the signal to the monitoring device in response to a change in state of the switch.

11. The network traffic monitoring apparatus according to claim 1, wherein in the first state of the switch, the first path is communicatively coupled to the monitoring device for transmitting the portion of network traffic to the monitoring device.

12. A node for a communications network, comprising:
a network path for transmission of network traffic;
a node device, arranged to process the network traffic; and
a network traffic monitoring apparatus comprising:
    a first path, arranged to receive a portion of the network traffic from the network path,
    a monitoring port, arranged to monitor the portion of network traffic,
    a switch coupled between the first path and the monitoring port, the switch being switchable between a first state in which the first path is not communicatively coupled with the monitoring port, and a second state in which the first path is communicatively coupled with the monitoring port for monitoring of the portion of network traffic,
    an actuator, arranged to switch the switch from the first state to the second state in response to a user operation, and
    a switch state indicator, arranged to output a signal to a monitoring device indicative of at least one state of the switch, wherein the at least one state of the switch is indicative of whether a monitoring event is taking place.

13. A method of monitoring network traffic on a network path, the method comprising:
receiving a portion of the network traffic from the network path;
monitoring the portion of network traffic via a monitoring port;
switching a switch coupled between the network path and the monitoring port from a first state in which the network path is not communicatively coupled with the monitoring port, to a second state in which the network path is communicatively coupled with the monitoring port for monitoring of the portion of network traffic, wherein the switch is switched from the first state to the second state in response to a an operation by a user; and
outputting a signal to a monitoring device indicative of at least one state of the switch, wherein the at least one state of the switch is indicative of whether a monitoring event is taking place.

14. The method according to claim 13, further comprising recording at the monitoring device when the switch is in the second state.

15. The method according to claim 13, wherein the signal to the monitoring device is indicative of an identity of the user.

16. The method according to claim 13, further comprising:
applying a transfer function to the received portion of the network traffic to form a signal for monitoring, wherein the transfer function is arranged to preserve a spectral property of said portion and to apply a time-domain obfuscation to said portion; and
outputting the signal for monitoring from the monitoring port.

* * * * *